US010324705B2

(12) United States Patent
Mohiuddin et al.

(10) Patent No.: US 10,324,705 B2
(45) Date of Patent: Jun. 18, 2019

(54) SYSTEM AND METHOD FOR RUN-TIME UPDATE OF PREDICTIVE ANALYTICS SYSTEM

(71) Applicant: ScoreData Corporation, Palo Alto, CA (US)

(72) Inventors: Kottappuram M. Mohiuddin, San Jose, CA (US); Prasanta Behera, Cupertino, CA (US); Vasudev Bhandarkar, Los Altos Hills, CA (US)

(73) Assignee: ScoreData Corporation, Palo Alto, CA (US)

( * ) Notice: Subject to any disclaimer, the term of this patent is extended or adjusted under 35 U.S.C. 154(b) by 20 days.

(21) Appl. No.: 15/454,829

(22) Filed: Mar. 9, 2017

(65) Prior Publication Data

US 2017/0262275 A1 Sep. 14, 2017

Related U.S. Application Data

(60) Provisional application No. 62/306,046, filed on Mar. 9, 2016.

(51) Int. Cl.
| | |
|---|---|
| *G06F 9/445* | (2018.01) |
| *G06N 99/00* | (2019.01) |
| *G06F 9/54* | (2006.01) |
| *G06N 7/00* | (2006.01) |
| *G06F 8/65* | (2018.01) |
| *G06N 20/00* | (2019.01) |
| *G06F 8/656* | (2018.01) |

(52) U.S. Cl.
CPC .............. *G06F 8/65* (2013.01); *G06F 8/656* (2018.02); *G06N 20/00* (2019.01)

(58) Field of Classification Search
None
See application file for complete search history.

(56) References Cited

U.S. PATENT DOCUMENTS

| | | | | |
|---|---|---|---|---|
| 8,370,280 B1* | 2/2013 | Lin | ...................... | G06N 99/005 706/12 |
| 2005/0189415 A1* | 9/2005 | Fano | .................... | G06Q 10/087 235/383 |
| 2014/0136452 A1* | 5/2014 | Wellman | .................. | G06N 5/04 706/12 |
| 2016/0055427 A1* | 2/2016 | Adjaoute | ............. | G06N 99/005 706/12 |

* cited by examiner

*Primary Examiner* — Umut Onat
(74) *Attorney, Agent, or Firm* — Schwegman Lundberg & Woessner, P.A.

(57) ABSTRACT

A computing system is provided that includes a runtime (RT) controller that produces a corresponding sequence of individual RT prediction results. A FIFO buffer organizes RT confidence score values into RT confidence score value frames. An RT storage circuit stores RT confidence values in an RT value histogram structure that indicates frequency of occurrence of individual RT confidence score values. A training controller produces training prediction results. A training storage circuit stores training confidence values in a training value histogram structure that indicates frequency of occurrence of training confidence score values. A comparison circuit compares RT confidence values with training confidence values in the training value histogram structure. A calibration controller circuit produces a calibration update signal based upon the comparison.

7 Claims, 17 Drawing Sheets

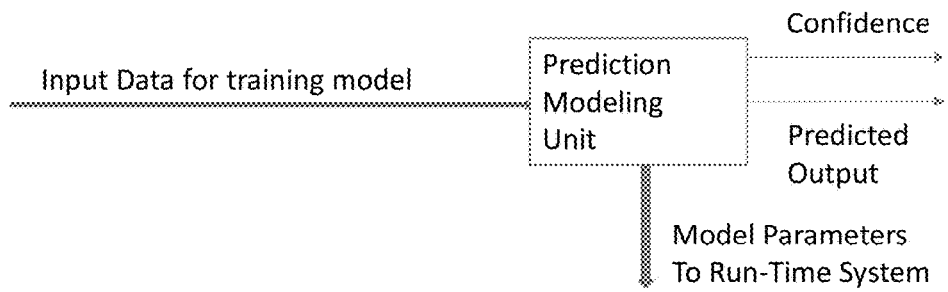
Figure 1a. Modeling System
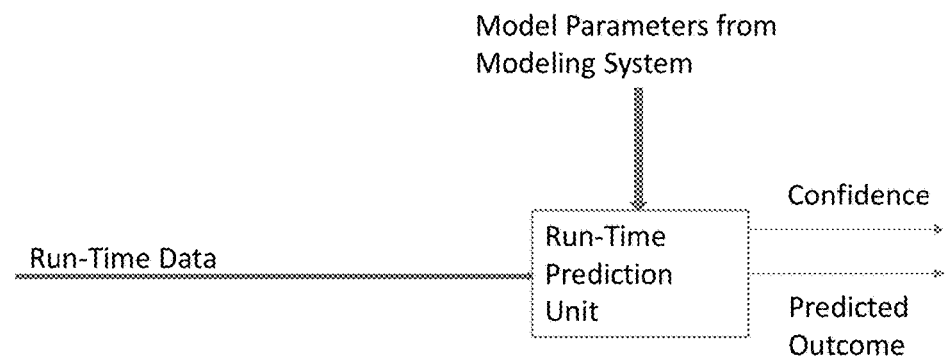
Figure 1b. Run-Time System
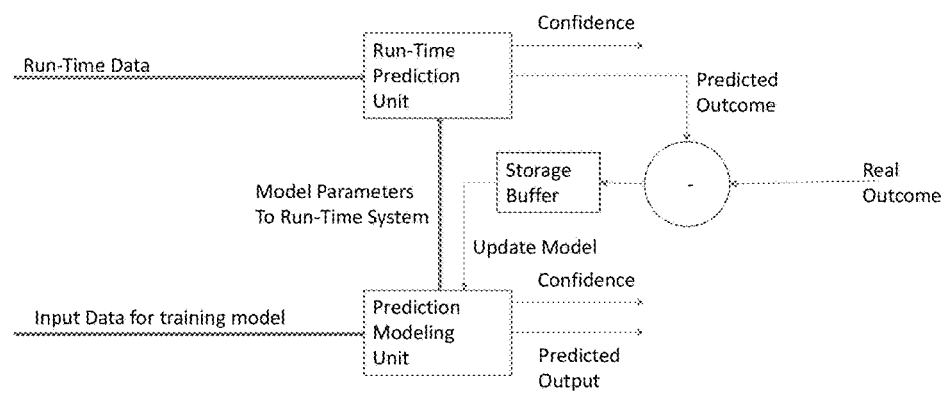
Figure 2. System for Model Update Mechanism (Manual Update)
(Prior Art)

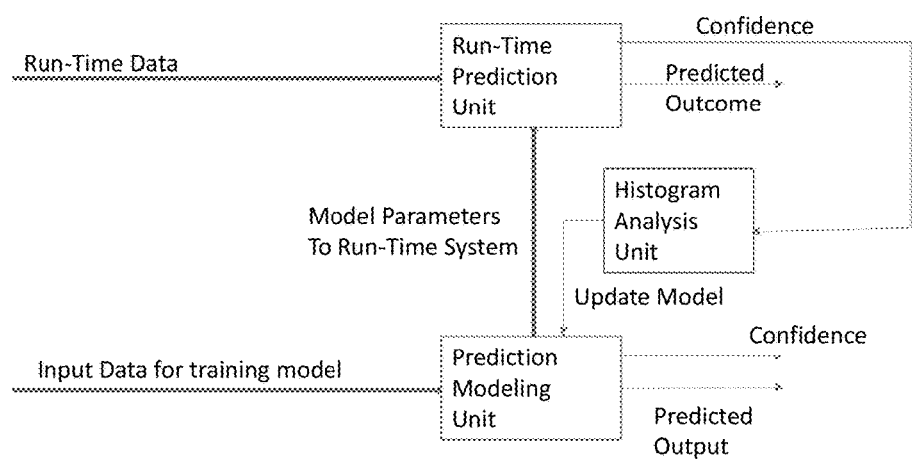
Figure 3a System for Real-Time Self Learning (Automated Model Update)

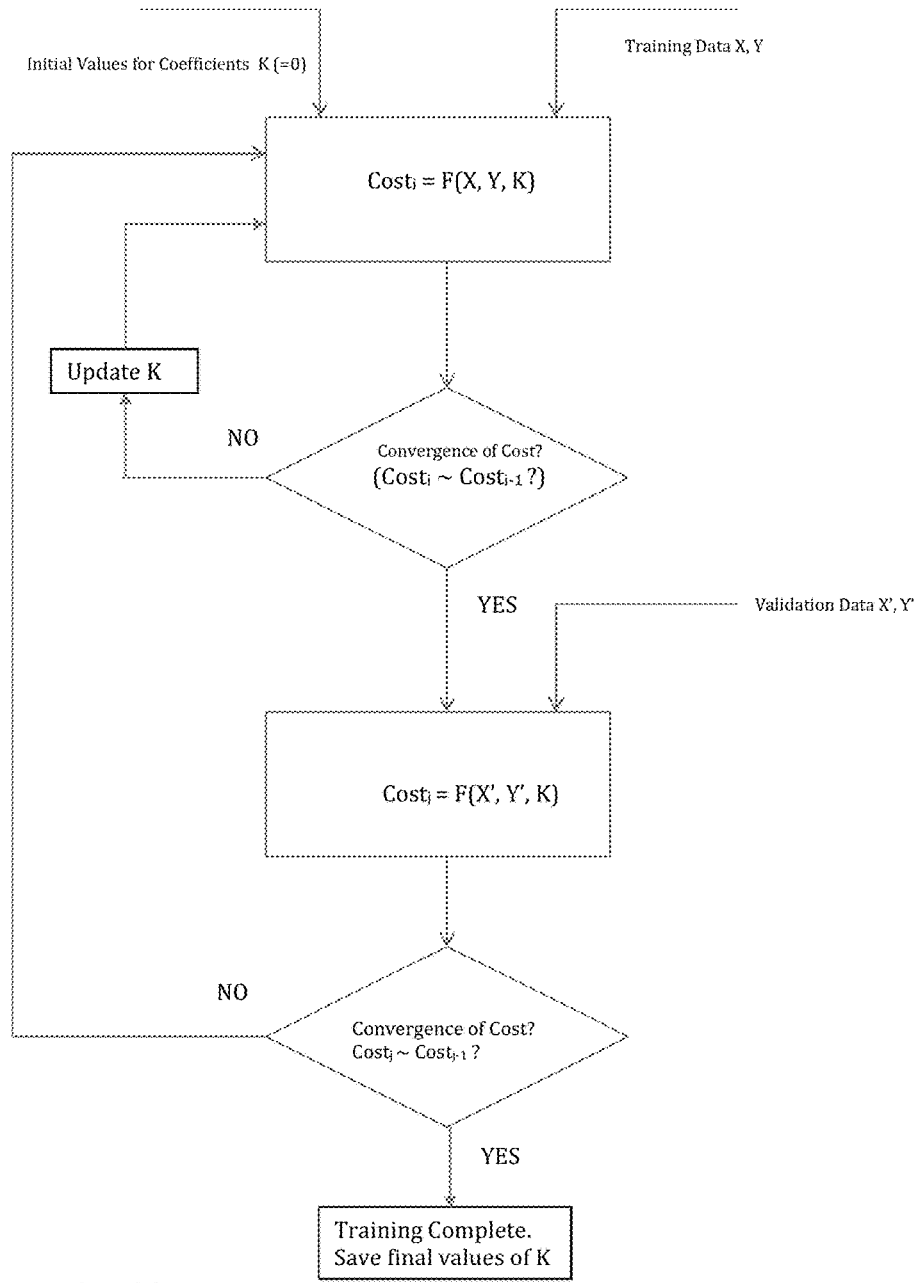
Figure 3b Model Training

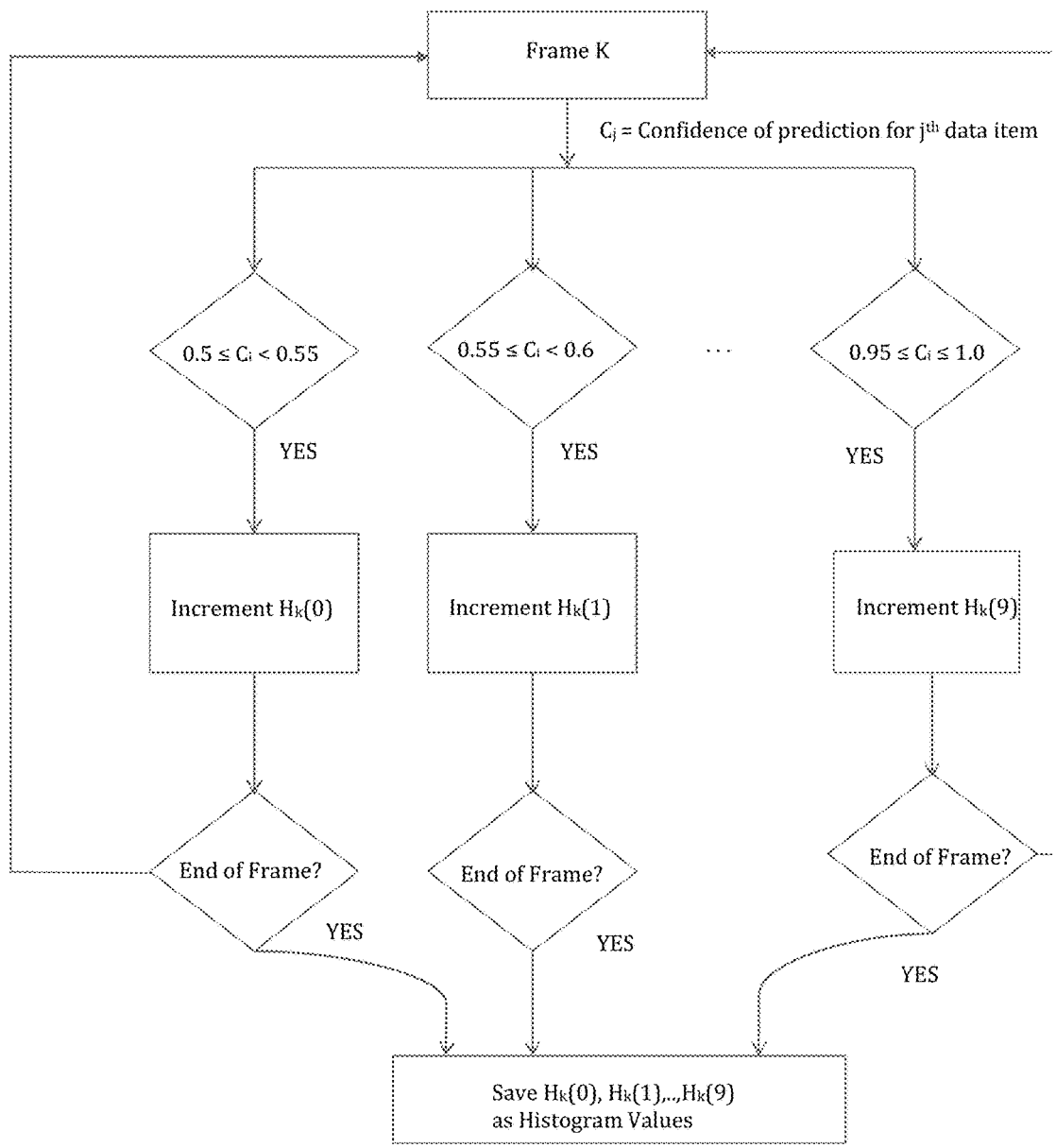
Figure 3c Construction of Histogram Data Structure

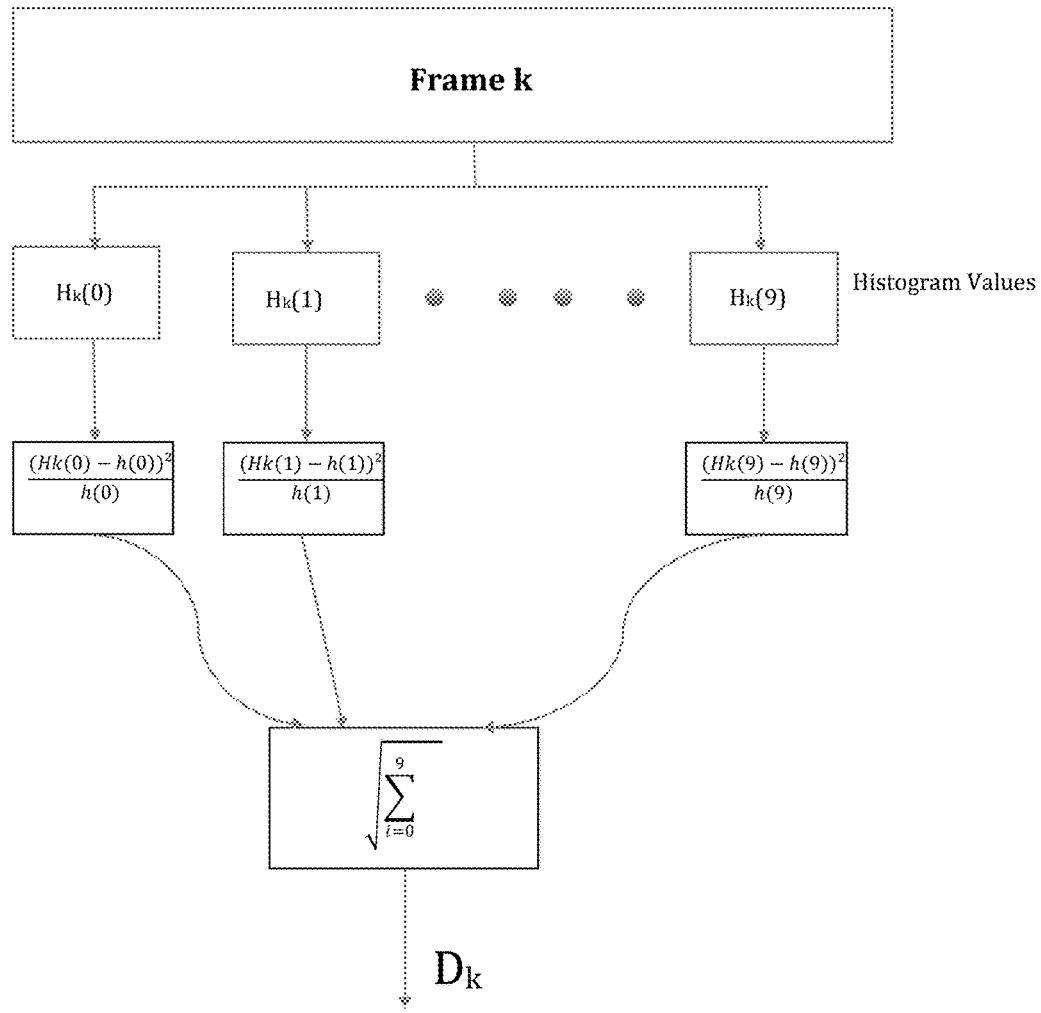
Figure 3d Histogram Distance Computation based upon Histogram Data Structure

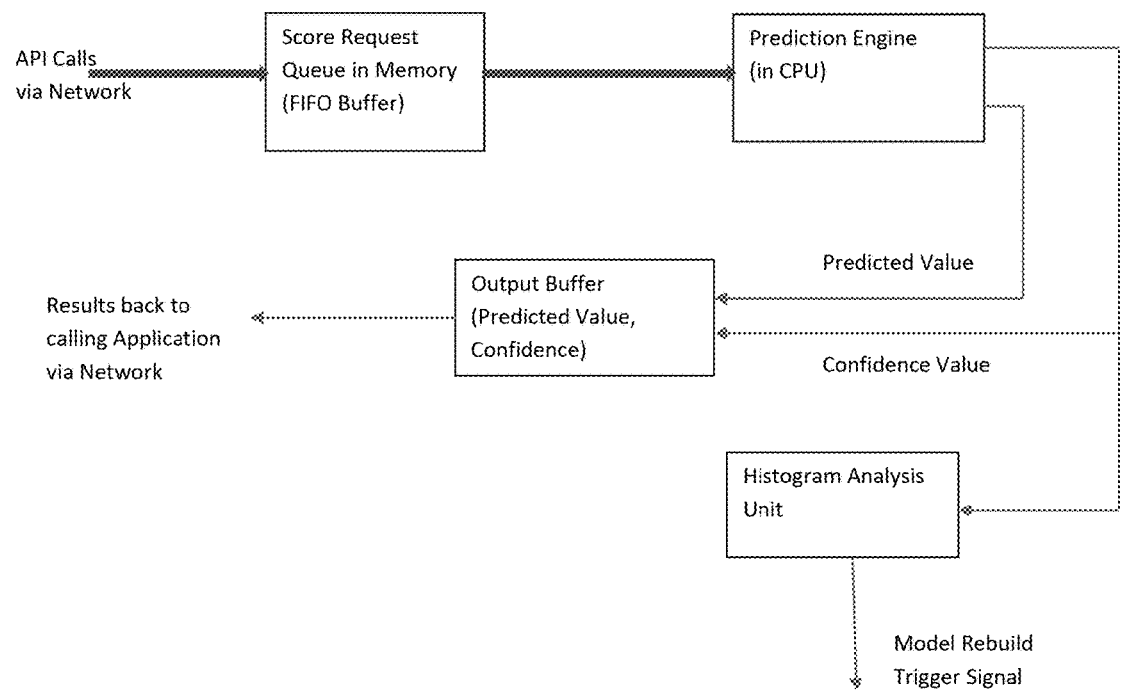
Figure 3e. Run-Time Prediction Server

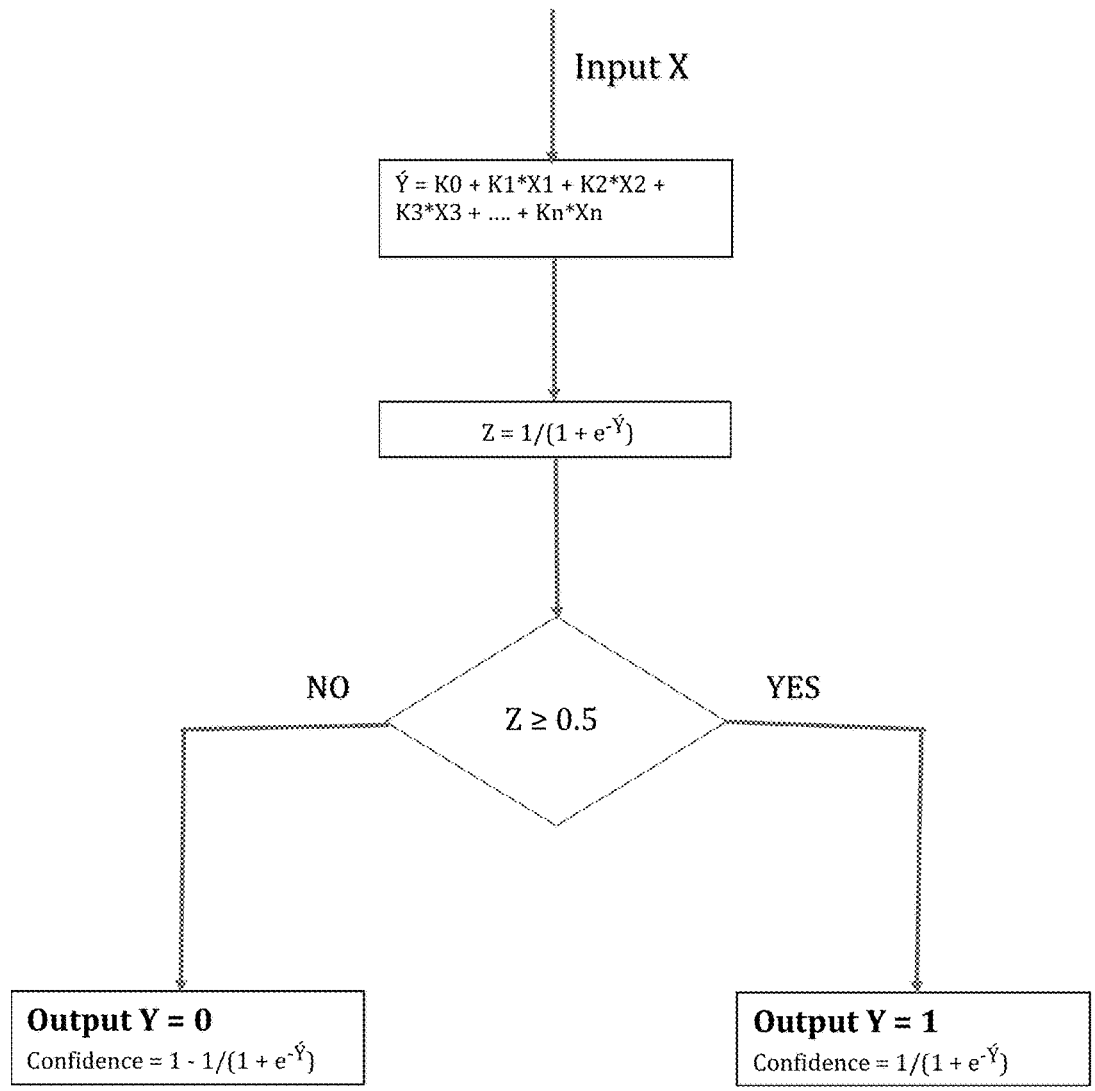
Figure 3f Prediction Engine using Logistic Regression

| id | member | loan_amn | term | int_rate | installme | grade | sub_grade | emp_leng | home_ow | annual_in | verificatic | issue_d | loan_stat | pymnt_pl | zip_code | addr_stat | dti | delinq_2y |
|---|---|---|---|---|---|---|---|---|---|---|---|---|---|---|---|---|---|---|
| 1077501 | 1296599 | 5000 | 36 month | 10.65% | 162.87 | B | B2 | 10+ years | RENT | 24000 | VERIFIED | 11-Dec | 1 n | | 860xx | AZ | 27.65 | 0 |
| 1077430 | 1314167 | 2500 | 60 month | 15.27% | 59.83 | C | C4 | <1 year | RENT | 30000 | VERIFIED | 11-Dec | 0 n | | 309xx | GA | 1 | 0 |
| 1077175 | 1313524 | 2400 | 36 month | 15.96% | 84.33 | C | C5 | 10+ years | RENT | 12252 | not verifi | 11-Dec | 1 n | | 606xx | IL | 8.72 | 0 |
| 1076863 | 1277178 | 10000 | 36 month | 13.49% | 339.31 | C | C1 | 10+ years | RENT | 49200 | VERIFIED | 11-Dec | 1 n | | 917xx | CA | 20 | 0 |
| 1075358 | 1311748 | 3000 | 60 month | 12.69% | 67.79 | B | B5 | 1 year | RENT | 80000 | VERIFIED | 11-Dec | 1 n | | 972xx | OR | 17.94 | 0 |
| 1075269 | 1311441 | 5000 | 36 month | 7.90% | 156.46 | A | A4 | 3 years | RENT | 36000 | VERIFIED | 11-Dec | 1 n | | 852xx | AZ | 11.2 | 0 |
| 1069639 | 1304742 | 7000 | 60 month | 15.96% | 170.08 | C | C5 | 8 years | RENT | 47004 | not verifi | 11-Dec | 1 n | | 280xx | NC | 23.51 | 0 |
| 1072053 | 1288686 | 3000 | 36 month | 18.64% | 109.43 | E | E1 | 9 years | RENT | 48000 | VERIFIED | 11-Dec | 1 n | | 900xx | CA | 5.35 | 0 |
| 1071795 | 1306957 | 5600 | 60 month | 21.28% | 152.39 | F | F2 | 4 years | OWN | 40000 | VERIFIED | 11-Dec | 0 n | | 958xx | CA | 5.55 | 0 |

*Figure 4. Example Input Data for Modeling*

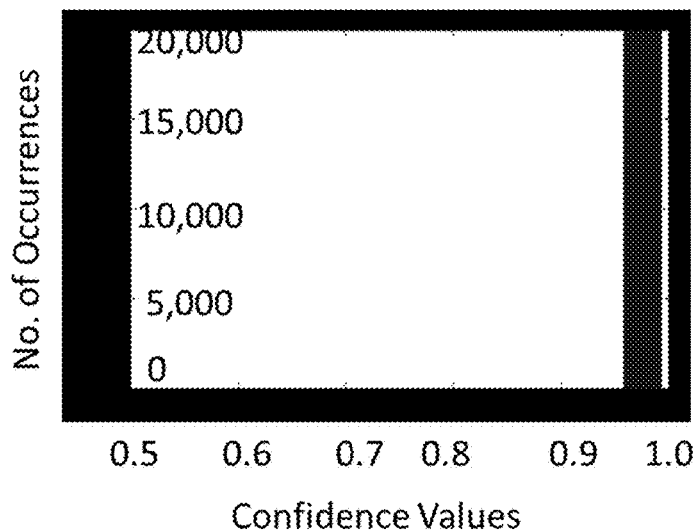

*Figure 5a. Histogram of Confidence Values of Training Data (data frame 0)*

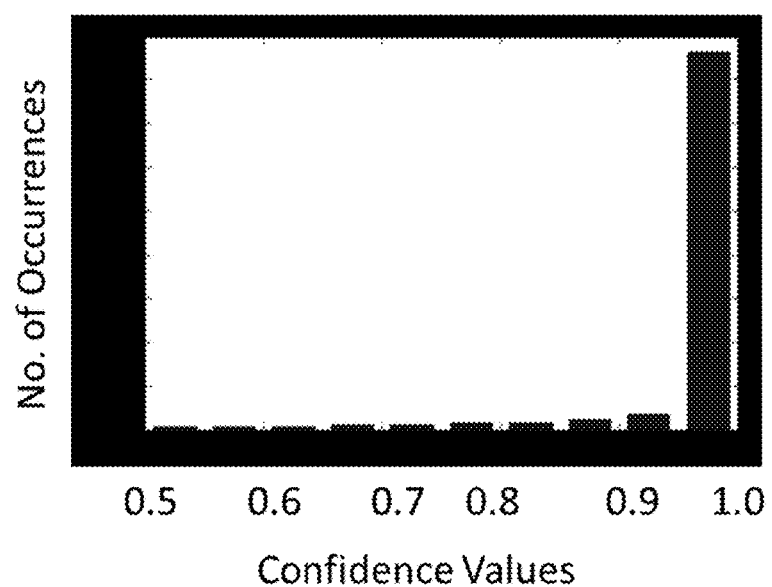
*Figure 5b. Histogram of Confidence Values of Test Data, for data frame 3*

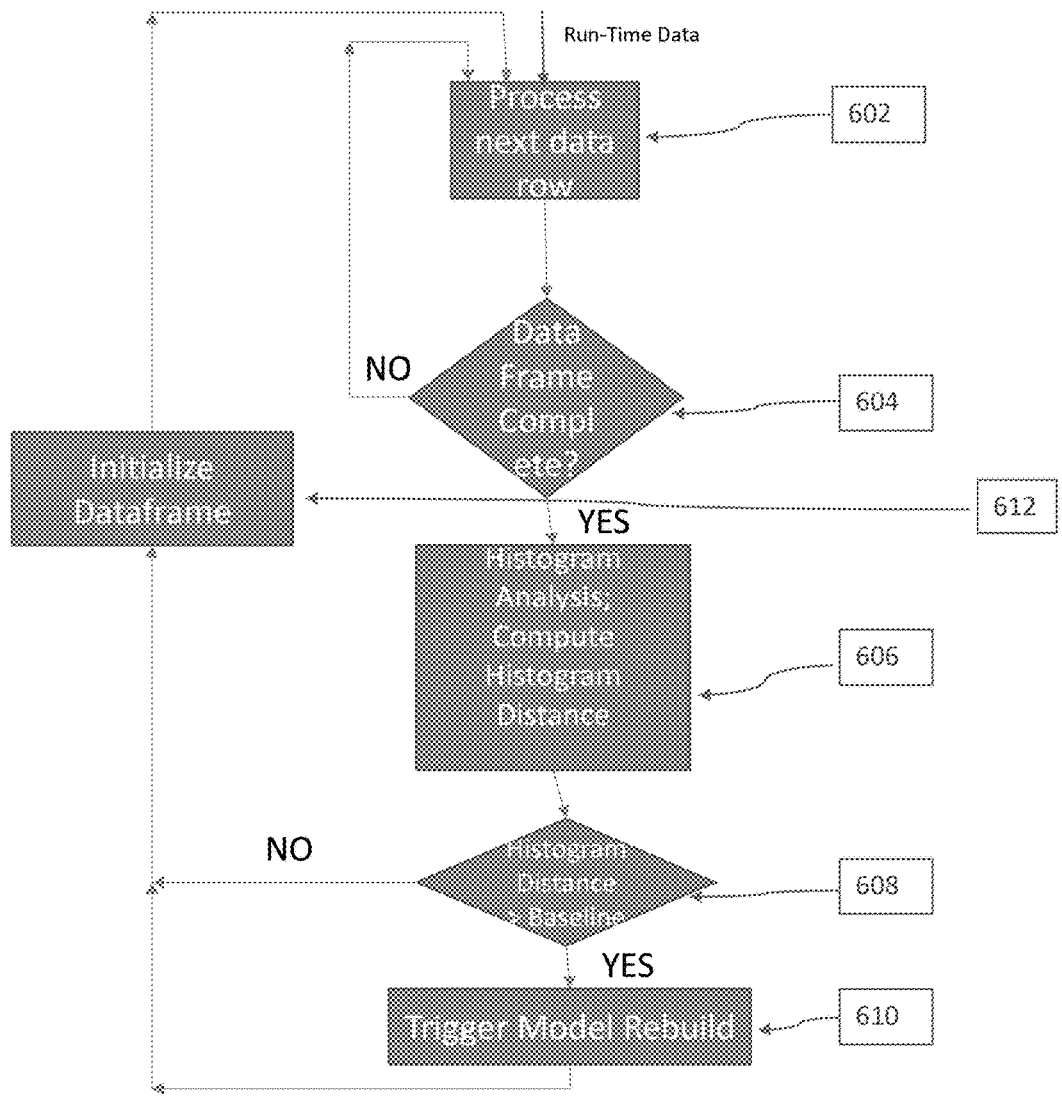
Figure 6a. Model Update Flow Diagram for Real-Time Self Learning

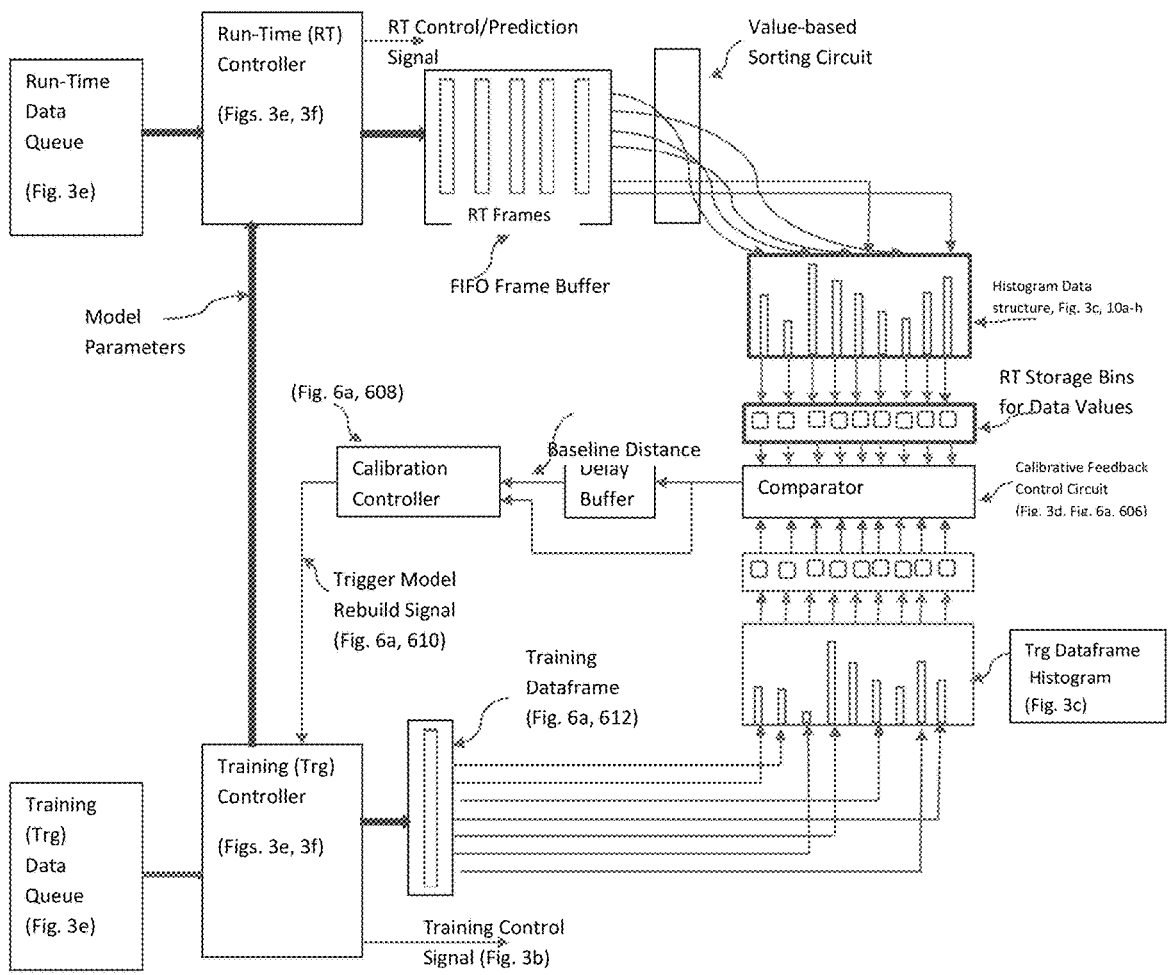
Figure 6b. Block Diagram for Real-Time Model Update System

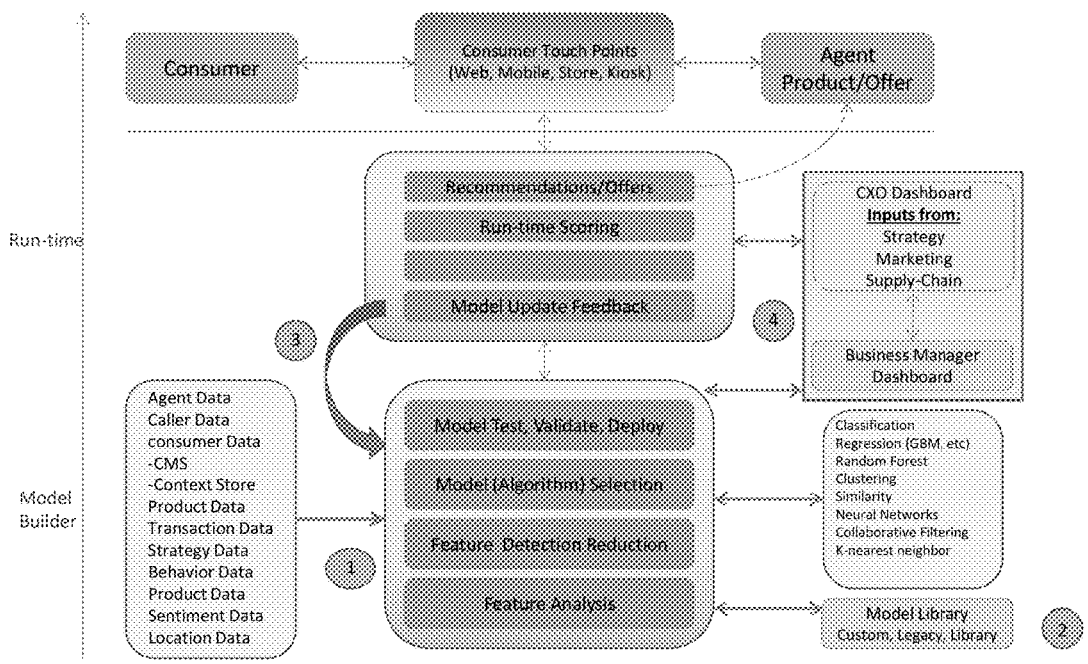
*Figure 7. Functional Organization of a Recommendation System incorporating Self Learning and Automated Model Updating*
| A | B | C | D | E | F | G | H | I | J | X | Y | Z |
|---|---|---|---|---|---|---|---|---|---|---|---|---|
| -9.90132 | 0.200089 | -4.80881 | 2.868766 | 12.61823 | 0.298695 | 1.317258 | -1.52491 | -0.62599 | -1.28619 | -1.86592 | -1.11859 | 0 |
| 48.96587 | 50.59368 | 54.50324 | 52.47187 | 58.25541 | -0.35701 | -0.03177 | -0.73036 | -0.77283 | -1.27353 | -1.19704 | -0.49731 | 1 |
| 14.41285 | 7.150403 | 0.058686 | 1.44214 | -5.97317 | -1.41793 | 1.158296 | 0.69336 | 0.554608 | -0.87338 | 1.69343 | -1.81504 | 0 |
| 44.15252 | 48.88981 | 47.22238 | 45.76257 | 63.8726 | 0.723112 | 0.721557 | 0.673268 | 0.886987 | -0.04817 | -0.27964 | -0.29691 | 1 |
| 68.36521 | 58.50007 | 56.87419 | 64.98393 | 44.3074 | -0.19515 | 0.18914 | -0.9811 | 1.218016 | -2.82631 | -0.80801 | -1.09865 | 1 |
| -3.22722 | -0.80965 | -2.51199 | 4.36557 | -18.6279 | -2.05561 | -0.3187 | -1.5726 | -0.0932 | -0.49838 | -0.58206 | -1.04013 | 0 |
| 45.92266 | 53.83108 | 62.65031 | 67.10611 | 44.5862 | 0.289364 | 0.556347 | 0.741699 | -0.1192 | -0.09288 | -0.31358 | -1.81888 | 1 |
| -1.36695 | -6.48416 | 2.52684 | -5.95896 | 10.6261 | 0.427268 | -1.07949 | -1.86834 | -0.09457 | 0.257036 | 0.325369 | 0.417088 | 0 |
| -6.0404 | 4.132857 | -3.67011 | 7.000842 | -14.2354 | -0.92683 | 0.815269 | 0.766175 | 1.146637 | -0.17272 | -0.18822 | 1.08834 | 0 |
| 9.995272 | 15.49174 | 0.572476 | 7.434565 | -1.48277 | -1.17799 | -2.0291 | 0.32213 | -1.1786 | 1.069292 | -0.39503 | 0.100805 | 0 |
| -3.39688 | -12.4477 | 5.069064 | 4.378478 | -4.94144 | -1.40998 | -0.31872 | -0.33098 | -0.86245 | -1.61225 | 0.147298 | 1.151624 | 0 |
*Figure 8. A partial view of synthetic data used in our experiments (Columns K through W not shown for better readability)*

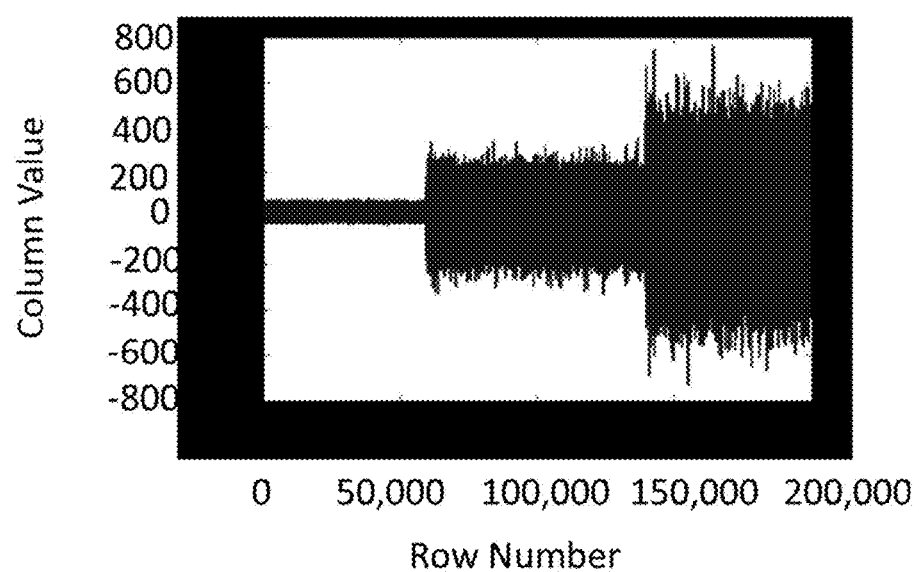
*Figure 9. Variation of Columns A through E*

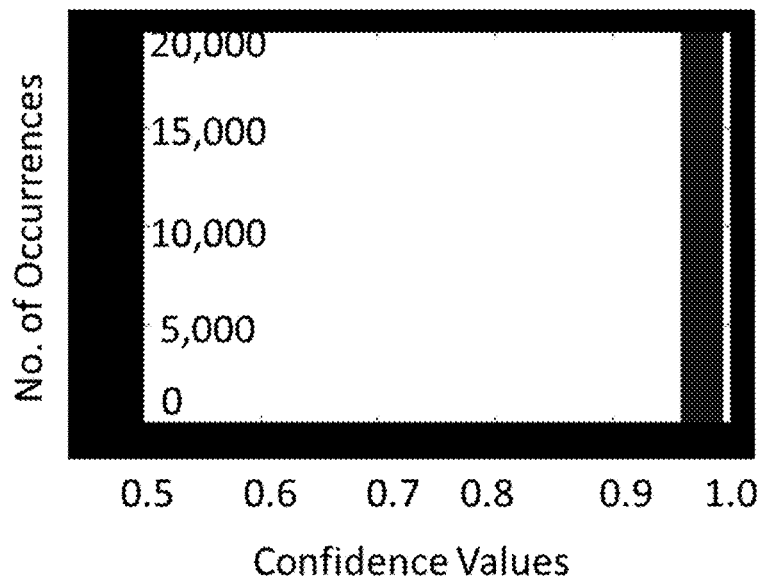
Figure 10a. Histogram of confidence values of Test Data, for Data frame 1
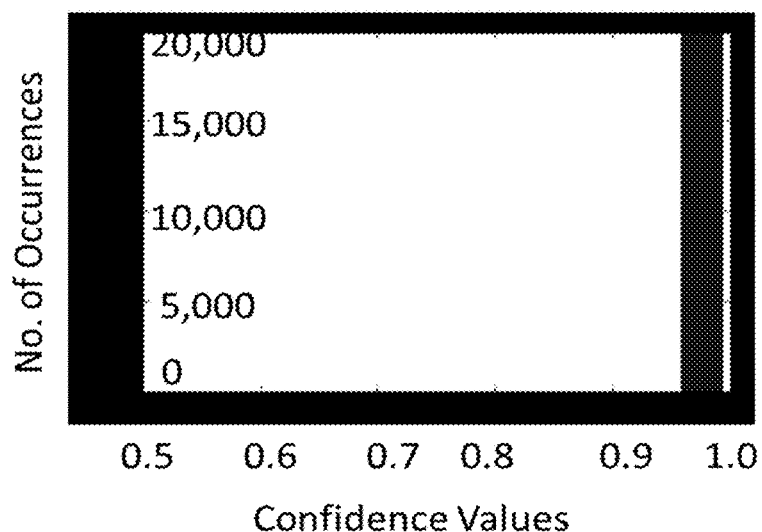
Figure 10b. Histogram of confidence values of Data frame 2

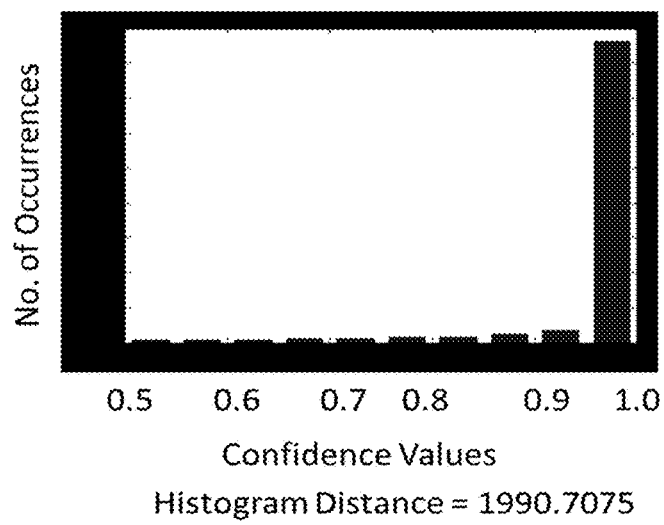
Histogram Distance = 1990.7075
*Figure 10c. Histogram of confidence values of Data frame 3 (same as Fig. 5b, with Histogram distance added). Histogram Distance greater than baseline value of 10*1.2630 (histogram distance of frame 2), hence trigger mode rebuild..*
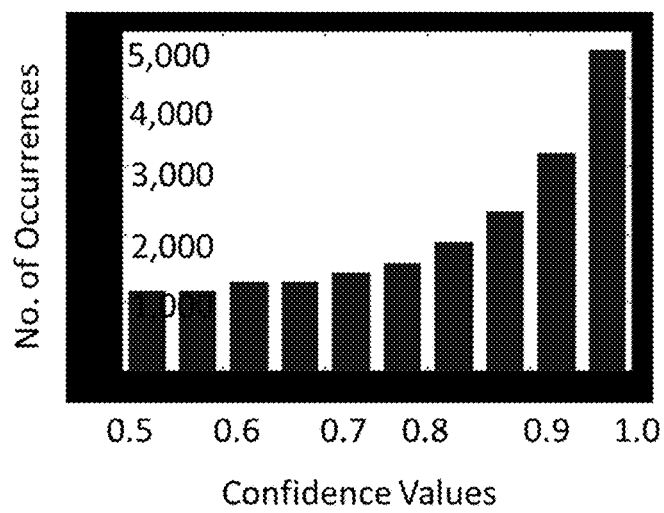
*Figure 10d. Histogram of confidence values of data frame 3 after model rebuild*

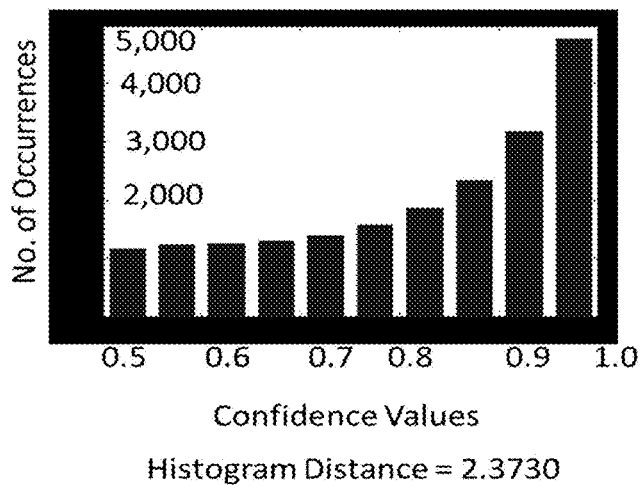
Figure 10e. Histogram of confidence values of data frame 6
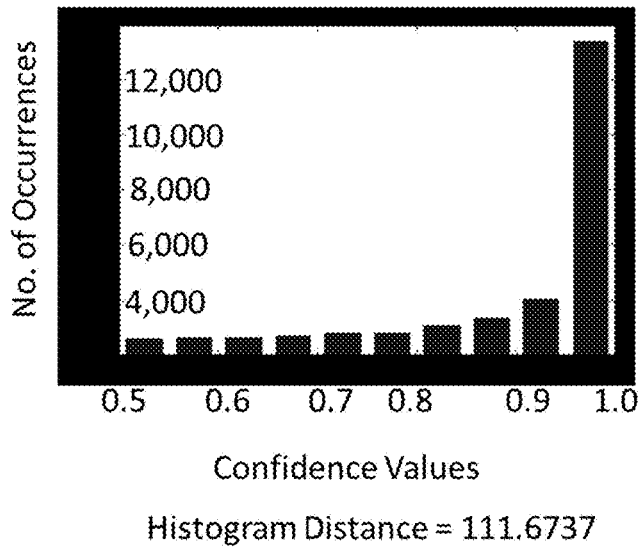
Figure 10f. Histogram of confidence values of Data frame 7. Histogram Distance greater than baseline value of 10*2.373 (histogram distance of frame 6), hence trigger model rebuild.

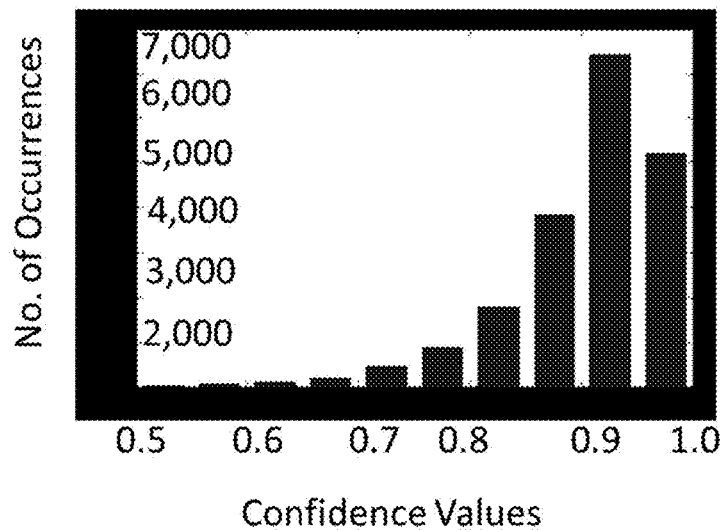
*Figure 10g. Histogram of confidence values of data frame 7 after model rebuild*
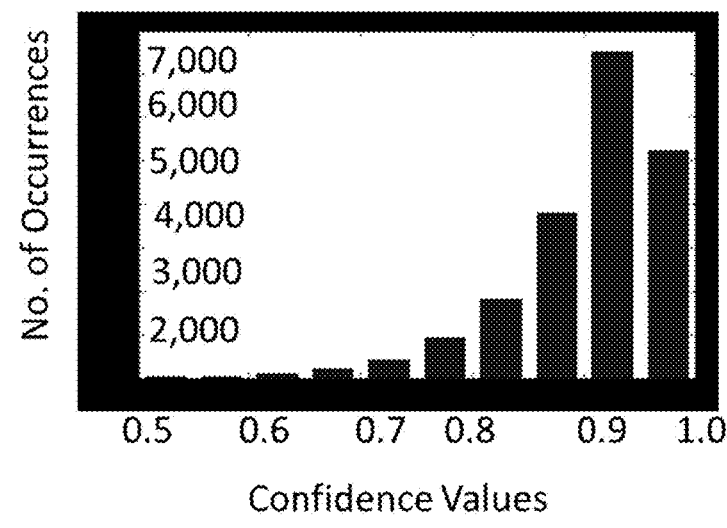
Histogram Distance = 4.9427
*Figure 10h. Histogram of confidence values of data frame 8*

SYSTEM AND METHOD FOR RUN-TIME UPDATE OF PREDICTIVE ANALYTICS SYSTEM

PRIORITY APPLICATION

This application claims priority to U.S. Provisional Application Ser. No. 62/306,046, filed Mar. 9, 2016, the disclosure of which is incorporated herein in its entirety by reference.

BACKGROUND

The tremendous growth of data amassed by organizations and enterprises has spurred the development of analytics systems to extract insights and actionable intelligence from the data. Machine learning is a field of analytics that configures computers with the ability to get better at a task as it performs more of the task, in other words, learning from repetitively doing the task. In the past, statisticians had developed various techniques, such as sampling, and summarization using parameters like mean, median, standard deviation, etc., while dealing with very large datasets due to limited computing resources. However, the availability of large computing resources at relatively low cost has enabled practitioners of machine intelligence to analyze all of the data to extract useful insights.

Machine learning involves configuring a computer system to learn from experience with respect to some task and some performance measure. As a result of machine learning, a computer system's performance improves with experience in the course of its operation. For example, consider the task of predicting customers who are likely to drop out of a service offered by a company, otherwise called churn prediction. Here the task is the prediction of those customers who are likely to drop out. Performance is the prediction accuracy, i.e., what percentage of the customers who were predicted to drop out actually did. And experience is the data that is provided to the prediction software on how well its prediction worked. So, a system exhibiting machine learning should improve its prediction accuracy over time as it is used in operation. The target operation can be predicting a continuous valued variable, such as forecasting inventory required for a store, or predicting one of a few discrete outcomes, such as whether a customer might drop out or not. The first case is known as a regression problem, whereas the second is called a classification problem.

There are a number of typical technical challenges in developing a machine learning system to work effectively for a given application. Choosing the appropriate datasets, cleansing the data and loading the data into appropriate repositories for analysis ordinarily is a first important step. The datasets made available are often dictated by the task. Another important step is selecting a feature set that adequately represents the data for the prediction task. In many applications, the data may consists of hundreds or even a thousand fields such as representing customer transaction history, credit scores, agent profiles, etc., for example. There is very often redundancy in such high-dimensional data. Thus, it often is necessary to reduce the dimensionality of the data before applying classification or regression analysis.

Once an appropriate feature vector is developed, another task is to develop a suitable classifier or regression model for the ultimate prediction task. There are a number of classifiers available in the literature, such as logistic regression, neural networks, support vector machines (SVM), etc. Models are initially trained using the training data available. As a system is deployed in the field, newly generated data from the results of prediction can be fed back to the system to train the models further. This is where the machine learning ordinarily comes in.

Over time, the nature and statistics of the data may change. This may make the prediction models less effective, necessitating in an update of the models. This phenomenon has been referred to as model decay. The model decay is addressed by updating the model from time to time, for example, every three months or annually, using more recent data. The decision to update the model often is made a priori by a business owner, for example, without quantitatively analyzing the effectiveness of the model with respect to the changing statistics of the run-time data. The collection of more recent data, updating of the model, and deployment of the new model are manual processes and may take weeks to months to complete. As a result, the manual updating of the model is expensive, inefficient and suboptimal.

So, how often and when should the models be updated? This is often a daunting task for many analytics deployments and companies. When and how to update the model is the primary problem we are addressing. The model needs to be updated when the prediction accuracy falls below an acceptable level. To compute the prediction accuracy, one needs to have the actual outcomes, compare them with the predicted outcomes, and determine what percentage was correct; please see the FIG. 2 for a bock diagram level representation of a system that relies upon actual results to update models. The storage buffer in the FIG. 2 is to collect enough actual data points on the accuracy of the model before triggering a model update. However, it may take weeks or months for the actual outcomes to be known, as in the case of loan payment default or customer retention applications. In the meantime, the model may be performing at a much lower accuracy level due to model decay. The challenge then is to determine how well the model is doing even before the actual outcomes, and hence the accuracy, are known. The method we disclose works equally well for classification and regression problems.

BRIEF DESCRIPTION OF THE DRAWINGS

FIG. 1A is an illustrative drawing representing modeling system.

FIG. 1B is an illustrative drawing representing a run-time system.

FIG. 2 is an illustrative drawing representing a system for model update mechanism (manual update).

FIG. 3A is an illustrative drawing representing a system for real-time self-learning (automated model update)

FIG. 3B is an illustrative flow diagram representing model training

FIG. 3C is an illustrative flow diagram representing construction of a histogram data structure.

FIG. 3D is an illustrative flow diagram representing histogram distance computation based upon histogram data structure.

FIG. 3E is an illustrative block diagram representing a run-time prediction server FIG. 3F is an illustrative flow diagram representing configuration of a prediction engine using logistic regression FIG. 4 is an illustrative drawing representing example input data for modeling.

FIG. 5A is an illustrative block diagram representing a histogram of confidence values of training data, for data frame 0.

FIG. 5B is an illustrative block diagram representing a histogram of confidence values of test data, for data frame 3.

FIG. 6A is an illustrative block diagram representing a model update flow diagram for real-time self-learning FIG. 6B is an illustrative block diagram representing a real-time model update system FIG. 7 is an illustrative block diagram representing a recommendation system.

FIG. 8 is an illustrative drawing representing a partial view of synthetic data used in experiments.

FIG. 9 is an illustrative drawing representing variation of columns A through E.

FIG. 10A is an illustrative drawing representing histogram of confidence values of test data, for data frame 1.

FIG. 10B is an illustrative drawing representing histogram of confidence values of test data for data frame 2.

FIG. 10C is an illustrative drawing representing histogram of confidence values of test data for data frame 2 (same as FIG. 5B, with histogram distance added).

FIG. 10D is an illustrative drawing representing histogram of confidence values of test data for data frame 3 after model rebuild.

FIG. 10E is an illustrative drawing representing histogram of confidence values of test data for data frame 6.

FIG. 10F is an illustrative drawing representing histogram of confidence values of test data for data frame 7.

FIG. 10G is an illustrative drawing representing histogram of confidence values of test data for data frame 7 after model rebuild.

FIG. 10H is an illustrative drawing representing histogram of confidence values of test data for data frame 8.

DESCRIPTION OF EMBODIMENTS

In one aspect, a system and method for run-time update of a predictive modeling system is provided. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known processes are shown in block diagram form in order not to obscure the description of the invention with unnecessary detail. Identical reference numerals may be used to represent different views of the same or similar item in different drawings. Flow diagrams in drawings referenced below are used to represent processes. Thus, the present invention is not intended to be limited to the embodiments shown, but is to be accorded the widest scope consistent with the principles and features disclosed herein.

Model Development and Deployment

A computer system is configured to implement a parameter based model that maps input data to a prediction output. If "$\acute{Y}$" is the prediction output, also called target variable or dependent variable, X is the input data, also called independent variables, and 'f' represents a functional mapping, then a general prediction model can be represented as:

$$\acute{Y}=f(X) \qquad \text{Equation 1}$$

A popular and effective model is the linear model, which can be represented as follows:

$$\acute{Y}=K0+K1*X1+K2*X2+K3*X3+\ldots+Kn*Xn \qquad \text{Equation 2}$$

Here X1, X2, ... Xn, are input data vectors, corresponding to columns of FIG. 4, and K0, K1, ... Kn are parameters (also referred to as coefficients) of the model. The objective of the modeling exercise is to determine the values of K0, ..., Kn, so as to minimize the prediction errors, (Y−), on a validation set. The input data vectors are represented at module 612 of FIG. 6A, which represents a model update flow diagram for real-time self-learning. More complicated models can be developed, such as polynomial model, neural network models, etc. For the purposes of this disclosure, we will largely deal with linear models. For binary classification models, such as '0' or '1', a further mapping is needed as follows:

$$Z=1/(1+e.\text{sup.}-) \qquad \text{Equation 3}$$

Z will now have a value of 0 for large negative values of $\acute{Y}$, and 1 for large positive values of $\acute{Y}$; it will be 0.5 for $\acute{Y}=0$. In general, if Z≥0.5, the output Y will be rounded to 1, and if Z<0.5, the output Y will be floored to 0. This is called the logistic regression function. Note that Z represents the probability of the prediction output value being '1', and (1-Z) represents the probability of the prediction output value being '0'. Since the output Y can take only one of "0" or "1" values, this can be generalized in the following equation:

$$C=-\{Y*\log(1/(1+e^{-\acute{Y}}))+(1-Y)*\log(1-1/(1+e^{\acute{Y}}))\} \qquad \text{Equation 4}$$

We call the probability "C" as the confidence value of the prediction.

The input data is divided into a training set (typically, 70% of the data) and a validation set (the remaining 30% of data). A model is trained on the training set and tested on the validation set to see how well the initial model would perform; this is done in the "modeling system," shown in FIG. 1A. If a validation data set is not used, there is a danger of the model being over-fitted to the training data, which may result in poorer performance on future test data. If the prediction results on validation data are not good enough, the training of the model is done again. This iterative improvement of the model is continued until a performance target is achieved; the separation of training and validation is not explicitly shown in FIG. 1A, but is shown in FIG. 3B. A cost function F(X, Y, K), which is proportional to prediction errors, but also includes additional terms to avoid overfitting, is used to decide on the convergence of training. Training iterations are continued as long as the cost function is decreasing, and is stopped when the cost stabilizes. The initial values for coefficients K are often set to 0 in FIG. 3B.

Once the initial model is developed, it is deployed for predicting the specific target variable or outcome on test data in the "run-time" system. Deploying a model specifically means using the trained model parameters from the modeling system for run-time prediction. Please see FIG. 1B below for an illustration of this concept. Associated with every prediction is a confidence value of that prediction. The prediction can be a classification problem, in which the output is one of a distinct set of outcomes, or a regression problem in which the output is real-valued number. For example, in loan default prediction problem, the output will be one of "Yes," corresponding to the customer defaulting, or "No." In such a binary classification problem, the outcome with the higher probability or confidence is chosen as the output, and hence the confidence will be between 0.5 and 1.0 (or 50% and 100%). Example of a regression problem is predicting real-estate prices one year in the future given the neighborhood, square footage, economic indicators, etc.

The actual means for deploying the prediction model is via a Run-time Prediction Server and is illustrated in FIG. 3E. It shows input request for prediction/scoring coming from software applications via a computer network through an Application Programming Interface (API). The requests are queued in an input buffer. When a prediction unit is available via any one of the Central Processing Units (CPUs) allocated for the prediction task, the input request from the top of the queue is removed and sent for prediction and confidence scoring. The functional flow of the prediction engine is illustrated in FIG. 3F. It essentially executes Equations 1 to 4. When the prediction/scoring task is completed, the results are stored in an output buffer and then sent to the calling application through the API.

Example Model 1

Lending decision: Credit Risk of a loan applicant is to be predicted. If the risk is high, the bank may want to reject the loan applied for. Please refer to FIG. 4, which is the training data for a lending decision problem. Here the column labeled "Loan Status" indicates whether the loan is approved (1) or rejected (0), and is called the dependent variable or target variable. To compute the values of this column, other columns in the training data (called independent variables) are used; they correspond to X0, X1, . . . Xn of Eq. 2, and the Loan Status column corresponds to Y of Eq. 2; please see the Para right after Eq. 3 on how Y is computed in a YES/NO classification problem. Not all columns are equally useful in computing Y. We will only use the most useful variables that aid in determining the loan risk; hence, only a subset of the columns is used in the model. For example, id, member id, etc., are irrelevant. It turns out by PCA analysis, zip code was the most important variable in helping assess the credit risk, followed by 2-year delinquency, employment length, home ownership, etc. This is not obvious, but the analysis shows the most useful columns.

When we update the model, the usefulness of the features may change. So, a different set of X0, X1, . . . Xm may be used in the updated model; note that the number of features may also change from n to m.

Example Model 2

Telecom Churn Risk Prediction: To predict the propensity of a telecom company's customers to drop out of service within next three months. The company would like to identify the segments of customers that are highly likely to churn in the near future and run preventive campaigns preemptively on them in order to mitigate the churn risk.

To develop a churn prediction model, we start with all the data sources and fields related to the customers and their relationship history with the company (customer profile/demographics, product details, usage history, billing history, payment history, customer service records etc.). As a part of the modeling process, we determine the most important data fields that predict a customer's churn risk behavior by feature analysis. We also estimate the relative prediction strength of the data fields chosen. The outcome of this machine learning process is the model, which is essentially a business rule on the data fields, and will only be valid till the time the training/test dataset used for the model development process correspond to the underlying business environment. The model performance will decay with time and then its predictive power will fall below the expected threshold because the underlying assumptions have changed. Since the churn prediction is over a 3-month period, the outcomes and hence the accuracy of the prediction will not available until after 3 months from the predictions. In the meantime, the model may be performing below its potential due to model decay. This is where our system and method comes in to enable detection of model decay and help trigger self-learning model update. It does away with the need to keep validating a model performance periodically and makes sure the model is up to date all the time.

Example Model 3

Promotion Response Models at Ecommerce Company— The social media marketing team at an ecommerce company wants to understand how their marketing dollars relate to the revenue generated, the intended objective of their social media marketing campaigns.

Like any predictive analytics use case, the system needs all the relevant data sources. For this use case, historical promotions data (marketing spends), web traffic data (visits, various levels of conversions etc.), response (sales) data, customer profile and other information are analyzed to determine important predictors and their relative prediction strength. Here, channel-wise sales are the response (target to be predicted) variable and all other data fields form the independent variable set. At a broader level, sales for a particular channel at a given time are dependent on promotion spend in the near past (promotion effect) as well as the sales in the near past (the momentum effect) among other things. But only through the machine learning exercise, will we know the exact predictor variables and their prediction strengths. A robust model means the marketing team will be able to optimally deploy their marketing dollars (right time/right places) to generate maximum sales. The model once developed on one training/test dataset will need frequent performance validations to make sure we retrain it when it falls below the set performance threshold. Here again, the real time self-learning capabilities of our system and method ensure the model is kept up-to-date dynamically.

Model Decay

In many tasks, the conditions of the tasks, and the initial data representing the task problem might no longer be valid, and the model built using it would no longer be effective at run time. This "model decay" will result in poor prediction accuracy of the business outcome. So, the model needs to be updated with more recent data to keep up with the changing nature of the data. When and how to update the model is the primary problem we are addressing. The model needs to be updated when the prediction accuracy falls below an acceptable level. To compute the prediction accuracy, one needs to have the actual outcomes, compare them with the predicted outcomes, and determine what percentage was correct; please see FIG. 2 for a generalized representation of the prior art architecture. The storage buffer in the FIG. 2 is to collect enough data points on the accuracy of the model before triggering a model update. However, in some cases it may take weeks or months for the actual outcomes to be known, as in the case of loan payment default or customer retention applications. The technical challenge then is to determine how well the model is performing even before the actual outcomes are available, and hence the accuracy, are known.

Run-Time Model Decay Evaluation and Real-Time Model Update

We solve this problem by evaluating the performance of the model at "run-time," comparing it with a baseline target, which will be explained below, and triggering a model update using the most recent data. As a result, models are constantly evaluated for effectiveness at run time and models updated if the prediction performance is no longer good enough. There are a number of technical problems to be solved in making this approach practicable. First, as pointed out before, it may take weeks or months to determine the actual outcome of predictions, by which time the input data corresponding to the predictions would have been long gone and the model completely out of date. For example, if a prediction is made that a customer is likely to drop out of a service by the end of the month based on the customer's use of that service, payment history, etc., the accuracy of that prediction will not be known until after the end of the month. If a significant percentage of the predictions turns out to be wrong, that means the model is getting out of date. It would appear that the feedback loop from actual outcomes needs to be closed immediately after a prediction to keep the model up-to-date, which however is not possible. Instead we use of the confidence level associated with a prediction. Even after solving the feedback loop problem, one needs to determine if the prediction effectiveness has deteriorated sufficiently to trigger an update of the model. We also propose a method for establishing a threshold below.

First, we can consider the input data to be conceptually divided into data frames. The length of the frame should be large enough to be used in training a model, but not so large that it spans too much variations in the data. The exact length is not important for our method to work. For now, let us consider that the data consist of data frames of 20,000 records each. Each record will have multiple columns; for example, in a loan application, the columns could be "Amount of Loan," "Employment Status," "Credit Rating," etc. In a typical application, there could be hundreds of columns of data. The variable to be predicted, also called the target variable or dependent variable, is represented by one column. A few example data records are shown in FIG. 4. Here the target variable is the "Loan Status" column, corresponding to whether payments are in default. The modeling unit analyzes which other columns it depends on and to what degree, and derives parameters for a mathematical function that defines the model.

Our intuition was that as the input data statistics change from the training data, the confidence values will start to have greater fluctuation. This is verified in FIG. 5A and FIG. 5B. In FIG. 5A, we show a histogram of the confidence values on a training data frame, where the confidence values are concentrated near 1.0. But, in FIG. 5B, the histogram on a test data frame shows the dispersion of the confidence values away from 1.0. The detail of the histogram computation are shown in FIG. 3C. The histogram computation is represented at modules 602, 604 of FIG. 6A. We have chosen to have 10 bins for the histogram, but the method would work for other values of bins also. So, what we need is an effective histogram distance metric. We make use of the Chi-Square distance metric, which is defined below:

$$Dk = \{\text{square root over}((\Sigma_{i=0}^{9} (Hk(i)-h(i))^2/h(i)))\}, \quad \text{Equation 1}$$

where, $Dk$ is the histogram distance of the kth data frame with respect to the training data frame, $Hk(i)$ is the histogram value of the ith bin of the kth data frame, and $h(i)$ is the histogram value of the ith bin of the training data frame. The computation of the histogram distance metric is graphically shown in FIG. 3D. Since $h(i)$ could be 0 for some bins, as in FIG. 5A, we add 0.1 to all 10 bins of $h(i)$ and subtract 1.0 from the last bin ($i=9$) to compensate for it. This adjustment is done to eliminate overflow from dividing by 0 in the equation for $Dk$. Since the training data frame corresponds to $k=0$, $D0=0$, since we are comparing the same two histograms. For test data, $Dk>0$, since there will be some deviation from the histogram for the training data. The histogram distance computation is represented at module 606 of FIG. 6A.

Now, the challenge is to decide when $Dk$ is large enough to trigger model update. We could use statistical methods like computing the p-value of $Dk$ to establish the histogram is sufficiently different from the distribution of the training data. But, we have devised a simpler method, which is the following: If $Dk > M*Dk-1$, we say the distance is large enough to trigger a model update. Here, M is a constant scaling factor and can be used to decide if the updates should be done frequently or not. We have found choosing $M=10$ works well in practice. It can be chosen smaller to trigger updates more frequently, and larger for less frequent updates. $Dk-1$ is the histogram distance of the $(k-1)$th data frame, i.e., the previous data frame, which incidentally had not triggered a model update. So, $M*Dk-1$ is the baseline value we compare the histogram distance $Dk$ against. The flow diagram for triggering model updates is shown in FIG. 6A. A description of the hardware architecture to implement the flow is given in the next section. We will illustrate the method with more experimental data in Section 11, "Detailed Description."

Note that the self-learning mechanism we have described can be employed in all predictive analytics applications. See, FIG. 7 for a functional organization of a Recommendation System that could be used to give recommendations to consumers by businesses via email, Web, phone, etc. We will not describe the system as it is peripheral to the method and means of real-time self-learning that we have described above.

System Architecture for Real-Time Model Update

FIG. 6B is an illustrative architecture level diagram of a predictive modeling system that includes components for real-time updates of the model based upon confidence scores. The system advantageously maintains prediction accuracy despite changes in data that can result in model decay and does so without the need to obtain actual results to evaluate prediction accuracy. In the example parameter-based linear model for prediction described above, K0, K1, K2, ..., and Kn are the parameters of the model, and X0, X2, ..., and Xn are the features used in the model. The input data may have been X1, X2, ..., Xp, where $p \geq n$. We determine the most important "n" features to use in the model using feature analysis methods, such as Principal Component Analysis (PCA); the details are irrelevant to the invention and are prior art. It will be appreciated that more complex models can be used, such as non-linear models, e.g. neural network models, decision trees, etc. But the features comprise a subset of the input data X0, X1, ..., Xp, and the parameters, K0, K1, ... Kn are computed from the training data to minimize a cost function (described in FIG. 3B).

A top portion of FIG. 6B shows the run-time (RT) scoring and histogram analysis blocks. A bottom portion shows corresponding training and analysis blocks. Run-time scoring requests are stored in the RT data queue, which is a FIFO queue. The RT Controller, which includes a processor and associated storage device (not shown), removes the request from the top of the queue for prediction and scoring. It applies the model that has been already generated by the model training unit to the input data, and outputs RT control signal, which corresponds to the prediction value, and RT calibration signal, which corresponds to the associated confidence value. Confidence values are buffered in FIFO frame buffers. The confidence values in the top frame buffer are sorted according to the magnitude of the values, which range from 0.5 to 1.0. A number of bins corresponding to value ranges, for example, 0.5 to 0.6, 0.6 to 0.7, etc., accumulate counts for corresponding values. The counts and the ranges represent the histogram for the frame buffer. Similarly, histogram is generated for the data frame that was used in training the model and stored in a buffer, shown at the bottom of FIG. 6B. The two histograms are compared in a comparator, which applies the function of Equation 5. The output is passed on to the calibration controller to compare against the baseline value, which is the histogram distance of the previous frame scaled by factor M, made available at the output of the delay buffer shown in FIG. 6B. The histogram distance baseline comparison is represented at module 608 of FIG. 6A.

If the current histogram value is greater than the baseline value, the calibration controller transmits a "model rebuild trigger" signal to the training controller. The model trigger determination is represented by module 610 of FIG. 6A. That sets into motion rebuilding and updating of the model. When the modeling function is complete, the model parameters are passed by the Training Controller, which includes a processor and associated storage device (not shown), to the RT Controller, as shown in FIG. 6B. From that point on, data scoring and prediction will be done using the updated model.

If the current histogram value is less than or equal to the baseline value, no rebuild triggering signal is generated by the configuration calibration controller, and the scoring will continue with the previous model. The model trigger determination is represented by module 610 of FIG. 6A. Thus, the hardware architecture shown in FIG. 6b, implements the process described in the previous section for real-time model updating and self-learning.

Thus, the system of FIG. 6B advantageously produces an information histogram structures used to indicate variability of run-time confidence scores and the variability of training data based confidence scores. A comparison of the run time confidence score variability with training data based confidence score variability provides an indication of model decay. In response to the comparison indicating a prescribed level of model decay, an update signal is triggered to cause model update. Thus, a model update is triggered based at least in part upon level of confidence variation.

Run-Time Model Update Example

We will describe the details with the help of a concrete example. We use synthetic data that we have generated using Gaussian mixture models. We generated synthetic data consisting of 200,000 records, each record consisting of 25 independent variables (Columns A through Y in FIG. 8) and one dependent variable (Column Z in FIG. 8). Columns K through W are not shown in FIG. 8 to improve readability of the table. The dependent variable Z is also the target variable to be predicted using the model. Columns A through E are the sum of two Gaussian variables, whereas Columns F through Y are determined by one Gaussian variable having the same distribution. The Gaussian distributions for A through E change at data points (or rows) 60,000 (corresponding to the start of data frame 3, assuming data frame numbering starts from 0) and again at 140,000 (corresponding to data frame 7). We show the distribution for Columns A through E in FIG. 9. Columns F through W do not change their statistics throughout the 200,000 rows.

We train our initial model using data frame 0 (rows 0 through 19,999). We then test the remaining data frames using this model. FIG. 5A shows the histogram of the confidence values with the training data. It is concentrated near a confidence value of 1.0. Since the data statistics do not change until row number 60,000 (data frame 3), we should expect similar histograms for data frames 1 and 2. That is indeed the case as shown in FIGS. 10A-10B. Notice that the histogram distance relative to that of the training data is also small, 1.9214 and 1.2630, respectively. However, FIG. 10C shows some dispersion in the histogram of data frame 3, and that is consistent with the change in data statistics. The histogram distance, Dk, for data frame 3 turns out to be 1990.7075, which is considerably higher than the baseline value of 12.630 (10*histogram distance for previous data frame 2). Therefore, a model rebuild is triggered with data frame 3 as the training data. The new histogram is shown in FIG. 10D. Surprisingly, there is considerable dispersion away from a confidence value of 1.0. However, the histograms look similar for the following frames. For example, FIG. 10E shows the histogram for data frame 6, and the histogram distance is only 2.373. FIG. 10F shows that the histogram looks different for data frame 7, with a histogram distance of 111.6737. Since that is greater than the baseline value of 23.73 (10*previous histogram distance of 2.373), a model rebuild is triggered. This is what we should expect as the data statistics change again at the beginning of data frame 7 (row 140,000). The new histogram for frame 7 after model rebuild is shown in FIG. 10G. The histogram for data frame 8 is shown in FIG. 10H, which looks very similar to FIG. 10G, with a histogram distance of 4.9427. Thus, our process is able to closely track the change in data statistics and trigger model rebuilds at appropriate times.

The invention claimed is:

1. A run-time updated predictive analytics computing system comprising:
   a runtime controller to,
      receive a sequence of runtime (RT) prediction requests, each RT prediction request including RT input data, and
      in response to the sequence of RT prediction requests, apply a predictive model to produce a corresponding sequence of individual RT prediction results, wherein each RT prediction result includes one or more corresponding RT prediction values and one or more corresponding RT confidence score values produced based at least in part upon the RT input data included with the individual RT prediction request and based upon one or more parameters of the predictive model, wherein each RT confidence score value within a RT prediction result corresponds to one or more RT prediction values within the RT prediction result;
   a First In First Out (FIFO) buffer operatively coupled to receive the RT confidence score values in a sequence in which they are produced and to organize the received RT confidence score values into a succession of RT confidence score value frames, wherein each RT confidence score value frame includes a plurality of RT confidence score values;

a sorting circuit operatively coupled to the FIFO buffer to,
- receive the succession of RT confidence score value frames in the sequence in which they are produced, and
- sort the RT confidence score values contained within individual received RT confidence score value frames according to magnitudes of the RT confidence score values;

an RT accumulation and storage circuit to accumulate counts of RT confidence score value magnitudes and to store the accumulated counts of RT confidence score magnitudes of successive RT confidence score value frames successive RT value histograms that have different bins to store frequency of occurrence of different ranges of RT confidence score magnitudes;

a training controller to,
- receive a sequence of training data requests, each training data request including training input data, and
- in response to the sequence of training data requests, apply the predictive model to produce a corresponding sequence of individual training prediction results, wherein each training prediction result includes one or more corresponding training prediction values and one or more corresponding training confidence score values produced based at least in part upon the training input data included with the individual prediction request and based upon the one or more parameters of the predictive model, wherein each training confidence score value within a training prediction result corresponds to one or more training prediction values within the training prediction result;
- in response to a calibration update signal indicating a prescribed level of model decay of the predictive model, produce updated parameters of the predictive model based at least in part upon the sequence of training data requests and provide the updated parameters to the runtime controller and to update its own parameters;

a training accumulation and storage circuit to accumulate counts of training confidence score value magnitudes and to store the accumulated counts of training confidence score magnitudes in at least one training value histogram that has different bins to store frequency of occurrence of different ranges of training confidence score magnitudes;

a comparison circuit coupled to successively compare frequency of occurrences of RT confidence score magnitudes in bins of the successive RT value histograms with frequency of occurrences of corresponding training confidence score magnitudes in corresponding bins of the at least one training value histogram and to produce a corresponding succession of comparison results;

a calibration controller circuit configured to produce a succession of calibration update signals indicative of a succession of histogram distance values indicative of model decay of the predictive model, based upon the succession of comparison results.

2. The system of claim 1 further including:
a training storage circuit coupled to receive the training confidence score values and to organize the received training confidence score values into at least one training confidence score value frame, wherein the at least one training confidence score value frame includes a plurality of training confidence score values received within a prescribed time interval.

3. The system of claim 1,
wherein the successive histogram distance values indicate successive distances between variability of the RT confidence score magnitudes indicated by successive RT value histograms and variability of corresponding of training data based confidence score magnitudes indicated by the at least one training value histogram.

4. The system of claim 1,
wherein the RT controller includes a processor; and
wherein the training controller includes a processor.

5. The system of claim 1 further including:
multiple central processing units (CPUs);
wherein the RT controller includes a processor allocated from the multiple CPUs.

6. The system of claim 1 further including:
multiple CPUs;
wherein the RT controller and the training controller include at least one processor allocated from the multiple CPUs.

7. The system of claim 6,
wherein the RT controller and the training controller include different processors allocated from the multiple CPUs.

* * * * *